Figures 1, 2:
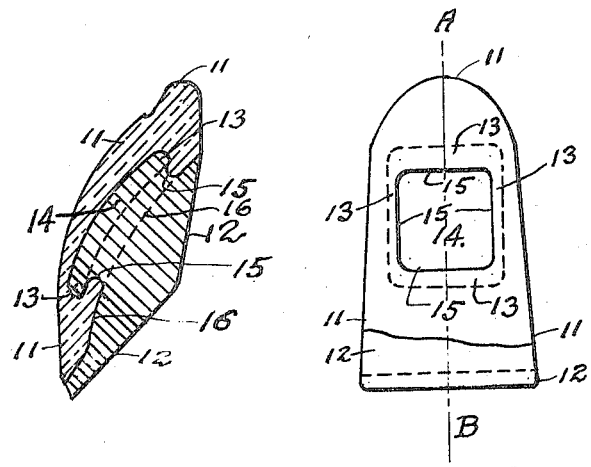

L. H. SPRINKLE.
BRIDGE TOOTH.
APPLICATION FILED NOV. 26, 1920.

1,384,869.

Patented July 19, 1921.

Inventor
Lake H. Sprinkle.
By his Attorney
Israel Benjamins.

UNITED STATES PATENT OFFICE.

LAKE H. SPRINKLE, OF BROOKLYN, NEW YORK.

BRIDGE-TOOTH.

1,384,869.  Specification of Letters Patent.  Patented July 19, 1921.

Application filed November 26, 1920. Serial No. 426,514.

*To all whom it may concern:*

Be it known that I, LAKE H. SPRINKLE, a citizen of the United States, residing at 310 Carlton Ave., Brooklyn, in the county of Kings and State of New York, have invented a new and useful Bridge-Tooth, of which the following is a specification.

My invention relates to bridge teeth containing a facing of porcelain and a backing of metal, and it consists in the novel features hereinafter more fully described.

The objects of my improvement are:

First: To eliminate the platinum pins from the facing of the bridge tooth, thereby reducing the cost of the same, and to secure the metal backing more effectively before soldering it in place; also to prevent the cracking of the porcelain of the facing when the metal is soldered in place.

Second: To provide a heavier backing for the bridge tooth, thereby insuring greater strength for the bridge.

Third: To permit the ready adjustment of the upper teeth with relation to the lower teeth, and vice versa, without interfering with any pins or the loosening of the backing.

Fourth: To have my bridge tooth simple, durable and comparatively inexpensive.

I attain these objects by the bridge tooth illustrated in the accompanying drawings or by any mechanical equivalent or obvious modification of the same within the scope of my invention.

In the drawings Figure 1 is a vertical section on the line A—B of Fig. 2, showing both the facing and backing of the tooth in place.

Fig. 2 is a rear elevation, looking from right to left in Fig. 1, showing the facing of my bridge tooth and the opening contained therein for the anchorage of the backing of the tooth, but omitting the greater part of the backing for the sake of clearness.

Similar numerals refer to similar parts throughout the several views.

11 designates the porcelain facing of my bridge-tooth; 12 is the metal backing, which is shown in Fig. 1 as anchored in the opening 14, which is contained in the facing 11.

The opening 14 is bounded by the perimeter 13, which has the form of a semicircular groove in cross-section; this groove is overhung by the bead or molding 15, which is also shown in Fig. 1 as semicircular in cross-section. The cross-section of the perimeter 13 and bead 15 is shown in Fig. 1 as a substantially continuous curve.

The groove 13 and the bead 15 of the opening 14 provide an anchorage for the metal backing 12, and the substantially semicircular outlines of said groove 13 and bead 15 render possible the flowing of the metal solder during the process of securing the backing 12 in place, without cracking the porcelain of the facing 11.

To provide a heavier backing for the bridge tooth I propose to make the rear 16 of the facing 11 concave, as shown in Fig. 1.

It is evident from an inspection of Fig. 1 that the quantity of metal in the backing 12 is considerably larger with the rear 16 of the facing concave than it would be with a facing having its rear in the form of a plane.

This feature affords extra strength for the bridge of teeth when formed.

The above original features of my bridge tooth may be embodied in the bridge teeth for any part of the mouth.

Some changes may be made in the form of my bridge tooth without departing from the main scope of my invention; I do not therefore restrict myself to the exact form of my tooth as shown in the drawings; but I intend to include also any mechanical equivalent or obvious modification thereof, which may be within the scope of my invention Wherever the term "facing" occurs in the claims hereinafter described, it is understood to mean the porcelain part of any tooth whether anterior or posterior.

What I claim as my invention and desire to secure by Letters Patent is:

1. In a bridge tooth a porcelain facing, adapted to have a metal backing secured thereto, said facing having a concave rear, thereby permitting a heavier backing for the same size of tooth and thereby increasing the strength of the same.

2. In a bridge tooth a porcelain facing having at its rear an opening for a metal backing to be anchored therein, said opening being encompassed by a perimeter, and the outline of the cross-section of said perimeter being a continuous curve adapted to render possible the flowing of the metal solder of the backing into said opening during the process of securing the backing in place without cracking the porcelain of the facing.

3. In a bridge tooth a porcelain facing having at its rear an opening, a metal backing anchored in said opening by filling the same, said opening being encompassed by an undercut groove and the metal rim of said anchorage filling the same, thereby forming a flange engaging said groove along its entire perimeter, thereby securing said backing in place.

LAKE H. SPRINKLE.